March 18, 1941.     J. J. SPALDING, JR     2,235,731

DAMPER

Filed Sept. 7, 1939

Inventor

J. Spaulding, Jr.

By Mason Fenwick & Lawrence
Attorneys

Patented Mar. 18, 1941

2,235,731

UNITED STATES PATENT OFFICE 2,235,731

DAMPER

Jack J. Spalding, Jr., New York, N. Y.

Application September 7, 1939, Serial No. 293,825

2 Claims. (Cl. 98—41)

This invention relates to dampers, and more particularly to a damper means for controlling fluid flow through a passage and for providing unobstructed fluid flow when the damper is open.

One object of this invention is to provide a damper which will have an open area at least equal to the area of the passage which it controls.

Another object is to provide a damper construction which will offer very little resistance to fluid flow.

Yet another object is to provide a damper which will have a direct proportional throttling action.

Still another object is to provide a damper construction having a maximum orifice opening with damper parts being substantially in a common plane.

Another object of this invention is to provide means which may be used as a diffusing grill, or an exhaust or supply register.

Other objects and advantages of this invention will appear from the following description taken in connection with the accompanying drawing.

In the drawing wherein like reference characters indicate corresponding parts in the various figures.

Figure 1:
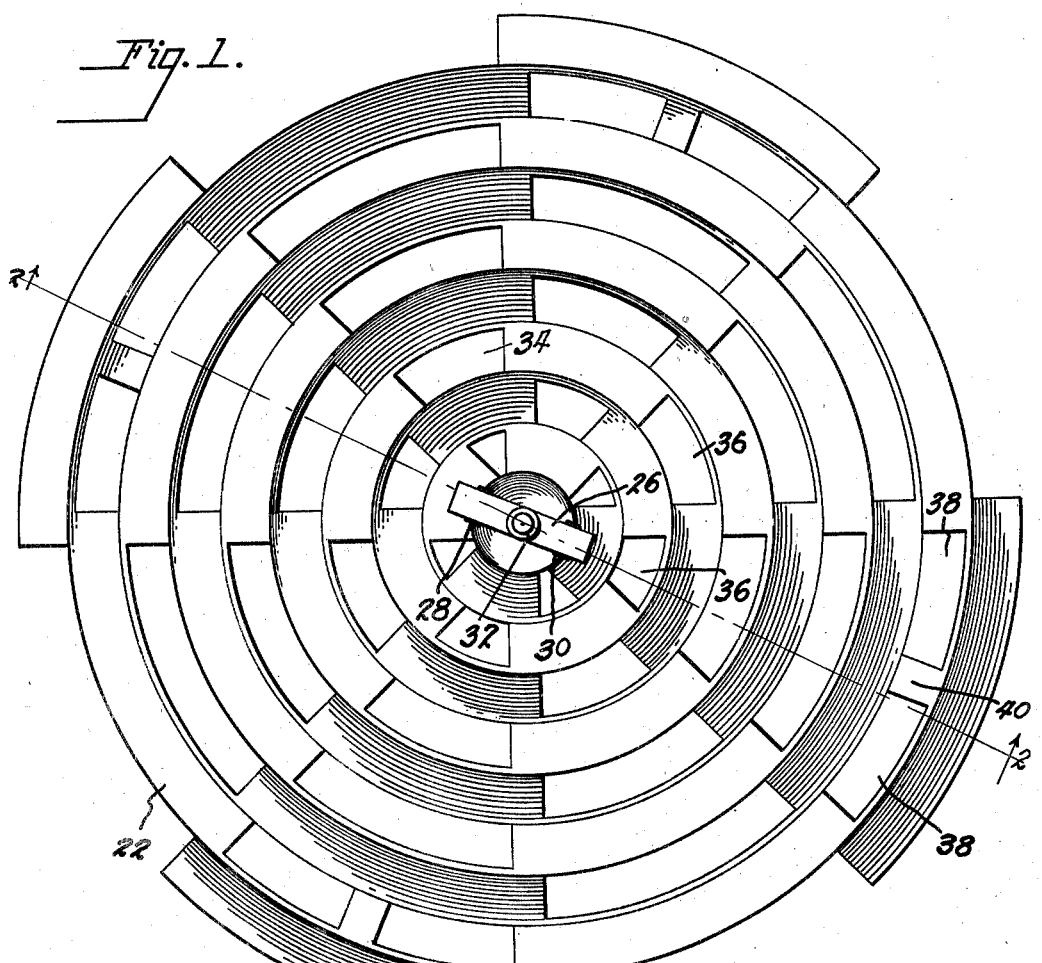
Figure 1 is a plan view of a damper construction incorporating features of this inventive concept.
Figure 2:
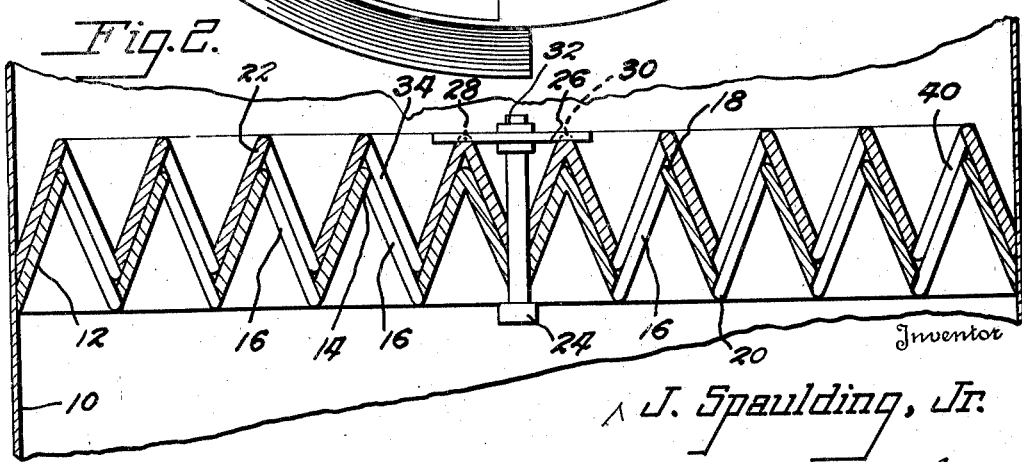
Figure 2 is a transverse vertical section taken substantially on the line 2—2 of Figure 1.

The damper in its preferred embodiment comprises similar concentric castings or stampings, placed one behind or above the other, each having similarly shaped apertures with the parts arranged for relative movement to provide a complete opening through a fluid passage.

Considering the drawing in greater detail, a partial section of a passage is indicated, comprising the tubular conduit 10 in which is secured one damper disc 12 formed with a series of concentric annular grooves or ridges 14, in the sides of the grooves of which are placed a plurality of arcuate louvres or slots 16. The peaks 18 and bottoms 20 of these annular grooves are so spaced that the total area of the openings 16 is at least equal to the cross-sectional area of the conduit 10. A similarly shaped damper element 22 is arranged to rest upon the relatively fixed damper element, and is yieldably secured thereto by a pin 24 which extends through the centers of the two damper elements, and secures a spring 26 in slots 28 and 30 of the outer disc. The spring is secured by a bolt 32 at the outer end of the pin. The outer member is similarly provided with arcuate slots 34 so that relative movement of the two discs uncover the slots and allows the air or fluid to freely pass through the damper.

The slots 36 near the center of the disc are continuous, whereas slots 38 which are more remote from the center of the disc are reinforced by bridging portions 40, tying together the ridges and channels of adjacent grooves.

The device of this invention may be used additionally as a diffusing grill or as an exhaust or supply register. Since warm and cold air resist mixing to a very marked degree, it is necessary to provide comparatively thin streams of warm or cold air which are directed into the room air with sufficient turbulence to create rapid mixing. With the device of the present application, due to the corrugations and location of orifices, eddy currents are created if the device is used as a grill without need for any additional elements to create such turbulence. As a result of the orifices introducing a series of spaced yet angularly disposed thin streams of air, eddy currents can be set up from such a grill, resulting in a very rapid mixing of the air in an enclosure with that being discharged from the device when used as a grill.

The provision for full and unobstructed flow when the damper is wide open, is arranged in a very shallow depth of construction so that the parts operate in substantially a common plane.

The construction as described gives an equal area through the damper to the duct area, and offers very little resistance to flow of gases, air and liquids. Any throttling action of the damper is in proportion to the movement of the revolving or sliding part, and this gives what is well known as a straight line relation.

Although a preferred embodiment of this invention is illustrated and described, variations within the true spirit and scope of the same are to be determined by the appended claims.

What I claim is:

1. A damper comprising nesting disk elements, each disk element formed with a plurality of coaxial circular grooves with spaced orifices in one of the side walls only of each of said grooves and the corresponding wall of all the grooves and pivot means rotatably associating said disks together.

2. A damper comprising nesting disk elements, each disk element formed with a plurality of grooves concentric therewith, with spaced orifices on one wall only of each groove and corresponding walls of all the grooves, a pivot pin centrally positioned through said disks having a head bearing against the central part of a disk on one side and a transverse spring element secured at the other end, the ends of said spring bearing against the adjacent ridge between grooves as specified.

JACK J. SPALDING, Jr.